United States Patent
Goker (10) Patent No.: US 6,437,934 B2
(45) Date of Patent: *Aug. 20, 2002

(54) SELF CALIBRATING EMBEDDED STRIPE BASED TIMING TRACKING SERVO SYSTEM FOR HELICAL RECORDERS

(75) Inventor: Turguy Goker, Solana Beach, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,601

(22) Filed: Apr. 16, 2001

Related U.S. Application Data (63) Continuation of application No. 09/250,670, filed on Feb. 16, 1999, now Pat. No. 6,281,675.
(60) Provisional application No. 60/074,770, filed on Feb. 17, 1998.

(51) Int. Cl.[7] ............................................. G11B 21/04
(52) U.S. Cl. ........................ 360/70; 360/75; 360/77.12
(58) Field of Search ..................... 360/77.13, 13, 360/15, 27, 70, 75, 77.14, 77.12

(56) References Cited

U.S. PATENT DOCUMENTS

| | | | |
|---|---|---|---|
| 4,598,327 A | | 7/1986 | Jen et al. |
| 4,675,760 A | | 6/1987 | Stadelmann et al. . 360/77.13 X |
| 5,014,139 A | | 5/1991 | Miyashita |
| 5,034,829 A | * | 7/1991 | Mahr ....................... 360/77.13 |
| 6,134,073 A | * | 10/2000 | Langford et al. ........ 360/77.13 |
| 6,281,675 B1 | * | 8/2001 | Goker ................. 360/77.14 X |

* cited by examiner

*Primary Examiner*—David Hudspeth
*Assistant Examiner*—Mitchell Slavitt
(74) *Attorney, Agent, or Firm*—Merchant & Gould P.C.

(57) ABSTRACT

The present specification discloses a preferred a preferred method, apparatus, and system for calibrating a magnetic tape system. The magnetic tape system comprises at least one head mounted within a head drum, a magnetic tape that has a data region and a no data region, the magnetic tape being contiguous with the head, and a device for providing a relative motion between the magnetic tape and the head. A preferred embodiment of the present invention has the following. A reference track provided on the magnetic tape. The reference track is located in the no data region, at a constant distance from the data region. A processor programmed to determine the time required for the head to travel from the provided reference track to the data region.

1 Claim, 10 Drawing Sheets

SELF CALIBRATING EMBEDDED STRIPE BASED TIMING TRACKING SERVO SYSTEM FOR HELICAL RECORDERS

CROSS-REFERENCE TO RELATED APPLICATIONS

This application is a continuation of application Ser. No. 09/250,670, filed Feb. 16, 1999, now U.S. Pat. No. 6,281,675 claims the benefit of priority of provisional application Ser. No. 60/074,770 filed Feb. 17, 1998, which applications are incorporated herein by reference.

BACKGROUND OF THE INVENTION

1. Field of the Invention

This invention relates generally to helical scan recording systems and in particular embodiments to an apparatus, system, and method for the self calibration of helical scan read and write heads.

2. Description of Related Art

In helical scan magnetic tape systems, a slow moving tape is wrapped around a cylindrical head drum. The head drum is typically composed of a rotating upper drum that is attached to a stationary lower drum. At least one magnetic read/write head is embedded into the upper drum. The magnetic tape is contiguous with the upper drum and it is positioned at a slight angle to the equatorial plane of the upper drum. A capstan motor is used to transport the tape at a slow speed, relative to the upper drum, and the opposite direction of the upper drum. Moving the tape in this manner results in a recording format in which successive tracks are written in a helical scan pattern (i.e., diagonally across the tape, from one edge of the tape to the other edge of the tape.) Each track corresponds to one field of data. The angle of the tracks are related to the geometry of the helical scan magnetic tape system, the width of the tape, and the rotation speed of the upper drum.

The lower drum has a precision cut edge that protrudes from the outer surface of the lower drum. The precision cut edge can be used to guide the tape edge and to hold the tape edge in place. The upper drum has an embedded pulse generator (PG) encoder. The PG encoder produces position-related timing pulses. These PG pulses are related to the characteristics of the upper drum (e.g., the rotating speed of the upper drum, the circumference of the upper drum, etc.).

The PG pulse can be used as a reference point for the read and write process. Namely, the PG pulse encoder produces a pulse signal every time the upper drum rotates one revolution. In conventional magnetic tape systems, the position of the read and write heads relative to the PG pulse is often known. That is, when the PG pulse is sensed, the read and write heads tend to be at a known position. The distance between the point at which the PG pulse is sensed and the start of the data tracks may also be known.

This distance value can be used to calculate the time (TØ) required for the heads to travel from the point at which the pulse is sensed to the start of a data region. Conventional magnetic tape systems may use TØ to ensure that the read/write heads are properly aligned over the tracks. Specifically, once the PG pulse is generated and sensed, the magnetic tape system waits TØ seconds, and then begins the writing process. During the read mode (or reading process), the magnetic tape system uses a capstan motor to control the timing, such that the time required for the read head to travel from the point at which the pulse is sensed to the start of a data region is always TØ.

The calculated TØ value represents the timing of a magnetic tape system when the tape position and alignment are perfectly controlled. Specifically, the tape is maintained at a constant vertical position relative to the cylindrical drum (i.e., the tape does not move up and down); the read heads are perfectly aligned with the data tracks on the tape before the reading process begins; and this alignment is maintained during the operation of the magnetic tape system.

During the writing process, many factors can affect the timing of magnetic tape system, producing a relative timing that is unequal to TØ. For instance, dirt build up on the lower drum cut edge or on the capstan motor shaft may cause the vertical position of the tape to vary. When the vertical position of the tape varies, the distance between the point at which the PG pulse is sensed and the start of a data region varies. Therefore, the time required for the read heads to travel from the point at which the pulse is sensed to the start of a data region also varies during the reading process. This varying time could be unequal to TØ. Thus, using TØ can cause read errors when the vertical position of a tape varies.

Read errors can also occur when one magnetic tape contains a group (or groups) of tracks written by different magnetic tape systems. Since the TØ value is generally related to the mechanics of a particular cylindrical drum, each drum may have a different TØ value due to manufacturing variations. Therefore, the magnetic tape system may be incapable of properly aligning the read heads with each group (or groups) of tracks because the magnetic tape system may only know the TØ value (and associated distance value) for tracks written by one magnetic tape system.

Figure 1:
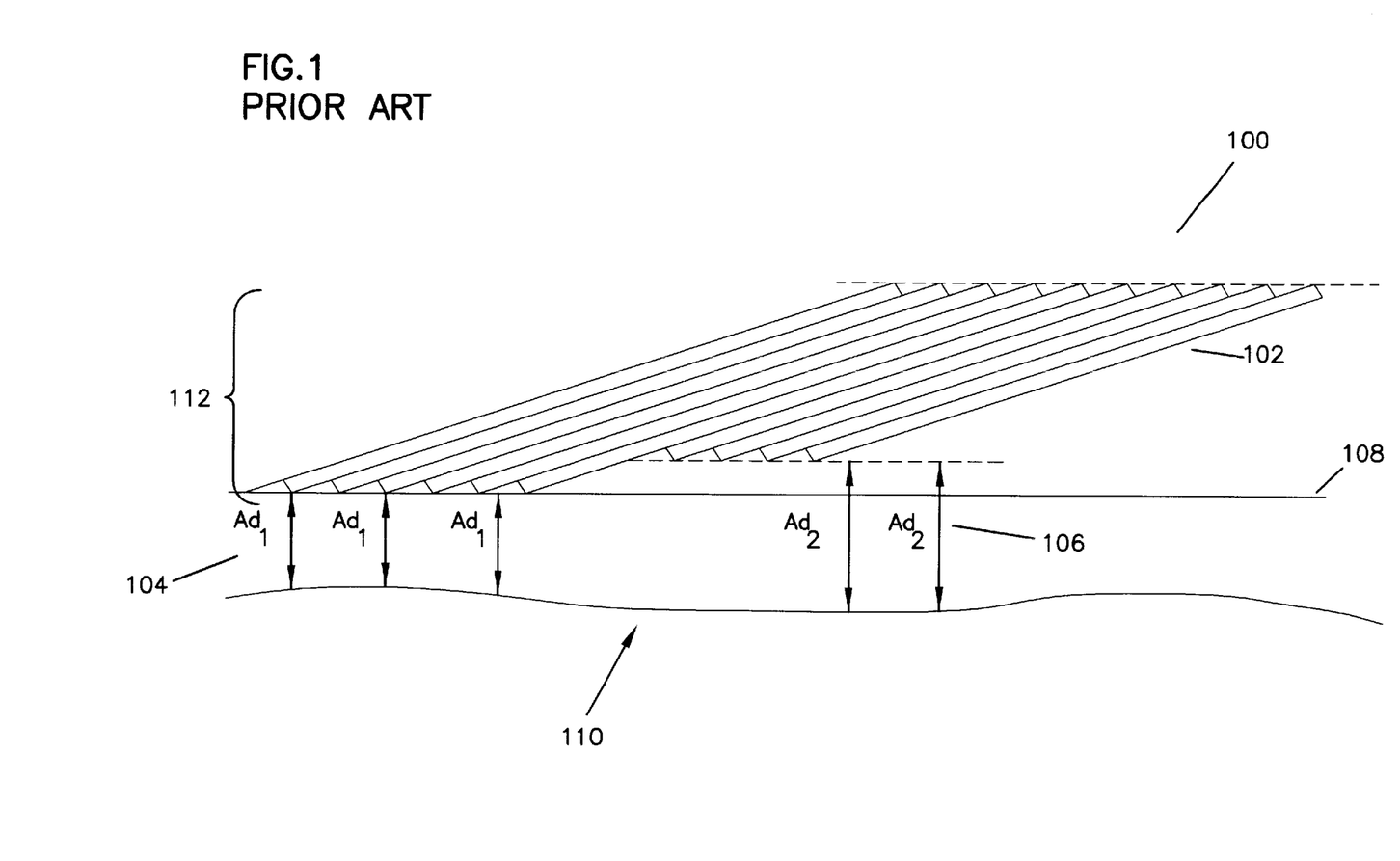
FIG. 1 illustrates exemplary data tracks produced by a conventional magnetic tape system.

FIG. 1 shows an exemplary tape 100 that has written data tracks 102. The distances, $\Delta d_1$ 104 and $\Delta d_2$ 106, represent the distance from the tape edge to start of a data region 108 of the tape 100. Distance $\Delta d_1$ 104 is produced by one magnetic tape system and distance $\Delta d_2$ 106 is produced by a another magnetic tape system. As observed, $\Delta d_2$ 106 is greater than $\Delta d_1$ 104. Consequently, the TØ value for $\Delta d_2$ 106 is greater than the TØ value for $\Delta d_1$ 104. The difference between $\Delta d_2$ 106 and $\Delta d_1$ 104 may be caused by many factors, such as variations in manufacturing, rotating speed of the upper drum, and environmental conditions during the operation of the magnetic tape system.

Minimizing the variation in distances is usually very difficult. Therefore, most conventional magnetic tape systems have calibration systems that recompute the TØ value when a read error occurs. Some calibration schemes involve control track techniques, automatic track follow (ATF) techniques, and timing tracking techniques.

For the control track technique, a servo write head (embedded in the upper drum) is used to write a control track on the magnetic tape during the write mode. The control track contains a series of 30-hertz pulses. These pulses are used to synchronize the read heads, causing the read heads to pass directly over the previously written data tracks. The control track serves the same general purpose as sprocket holes in a movie film. The sprocket holes help align each frame so that a viewer sees a steady picture on the screen. However, a problem with the control track technique is that it generally requires at least four heads: a data read head for reading data; a servo read head for sensing the control track; a data write head for writing data; and a servo write head for writing the control track.

Using additional servo heads during the read and write process may affect the performance of the magnetic tape system. In particular, before data is written to the tape, the servo write head writes the control track. Hence, the time required for writing data is increased. Similarly, before data is read, the servo read head senses the control track, increasing the time required for reading data. As a result, additional servo heads tend to degrade the performance of the magnetic tape system.

The automatic track follow (ATF) uses four pulses to mark successive data tracks. During the read mode, the read heads sense the ATF pulses. These ATF pulses are usually very low frequency signals and they can be used to provide a position error signal (PES). Based on the PES, the ATF technique continually adjust the read heads during operation of the magnetic tape system, causing the read heads to pass directly over the written data tracks. Unfortunately, the ATF technique lacks accuracy at high track densities. The ATF pulses and data tracks occupy the same data region 112. Hence, the ATF pulses occupy space that could be used by additional data tracks, causing density problems.

In the timing tracking technique, the read heads are locked onto the data tracks using a special synchronization field within the data itself. If the relative timing of the read head, which senses the synchronization field, is known, then a capstan motor (or any tape transport mechanism) can be used to lock the read heads on the data tracks by controlling the timing (i.e., the time at which a read head passes over a portion of the tape). Since the tape edge is mechanically held against the lower drum cut edge, the position of the written data tracks relative to a read head, may vary over the length of the tape. To prevent read errors, the timing tracking technique frequently re-aligns the head with the data tracks.

The timing tracking technique is more accurate than both the control track technique and the ATF technique, but it tends to require frequent calibration during the operation of the magnetic tape system. This frequent calibration slows down the process of transferring data to the magnetic tape.

Figure 2:
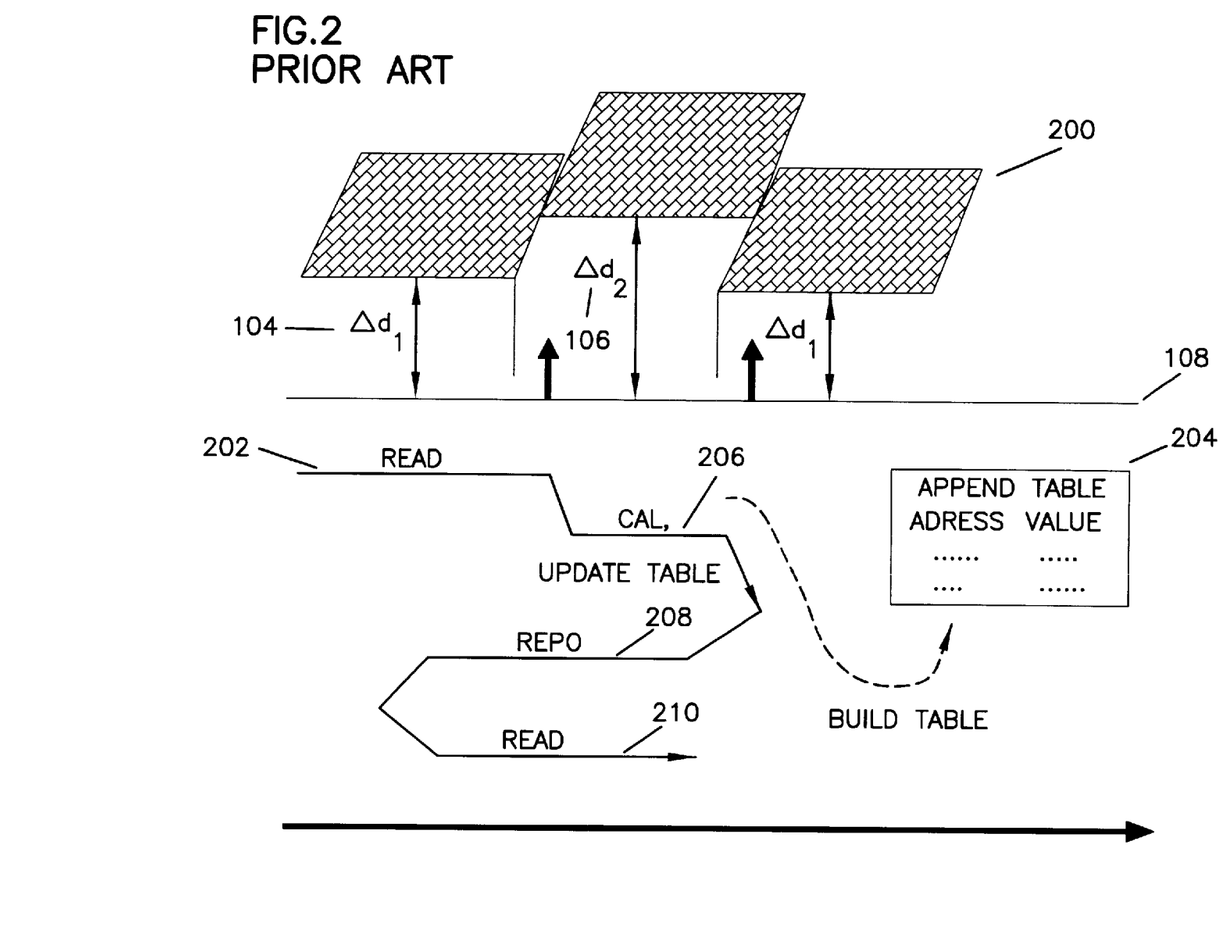
FIG. 2 represents an exemplary frequent calibration scenario in accordance with the ATF technique.

FIG. 2 represents an exemplary frequent calibration scenario in accordance with the timing tracking technique. The read head senses the start of the data region 108. The read head then performs a first read 202 on a data track 200 that has a distance $\Delta d_1$ 104. After an elapsed time, a read error occurs. The magnetic tape system performs a first calibration 206 to establish the correct TØ for the data track 200 that has a distance $\Delta d_2$. This calibration is performed because $\Delta d_2$ is greater than $\Delta d_1$. The correct TØ may be stored in the look-up table 204 for subsequent reads. The look-up table 204 contains track numbers and associated TØ values. Based on the information in the look-up table 204, the magnetic tape system performs a first repositioning 208 of the heads. The second read 210 is then performed. This process of calibration and re-calibration is performed every time a read error occurs. It is conceivable that the tape could continually move up and down during the write process, causing offset written data regions. These offset written data regions are referred to as appends. Appends typically require continual re-calibration. Frequent calibration can produce poor results in audio or video playback because during the calibration, no data is played back. Therefore, the audio and/or video data may be interrupted.

Thus, there is a need in the art for an improved calibration system that maintains alignment between the read heads and the data tracks during the operation of the magnetic tape system, without using additional heads, ATF pulses or frequent re-calibration.

SUMMARY OF THE DISCLOSURE

To overcome the limitations in the prior art described above, and to overcome other limitations that will become apparent upon reading and understanding the present specification, the specification discloses a preferred system, apparatus, and method of calibrating for use with a magnetic tape system. The magnetic tape system comprises at least one head mounted within a head drum, a magnetic tape that has a data region and a no data region, the magnetic tape being contiguous with the head, and a device for providing a relative motion between the magnetic tape and the head.

A preferred embodiment of the present invention has the following. A reference track provided on the magnetic tape. The reference track is located in the no data region, at a constant distance from the data region. A processor programmed to determine the time required for the head to travel from the embedded reference track to the data region.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description of preferred embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the preferred embodiments of the present invention.

Preferred embodiments of the present invention relate to apparatuses, systems, and methods for self calibrating a magnetic tape system. In particular, embodiments of the present invention maintain alignment between the read heads and the data tracks during the operation of the magnetic tape system, without using additional heads, ATF pulses or frequent re-calibration.

Figure 3A:
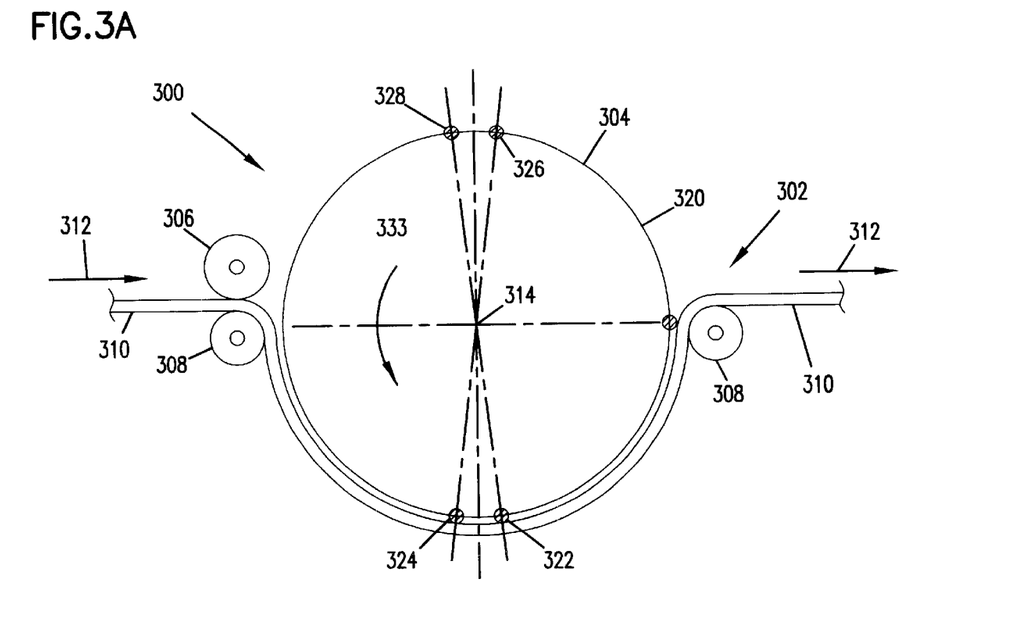
FIGS. 3A–3C illustrates a conventional magnetic tape system.
Figure 3B:
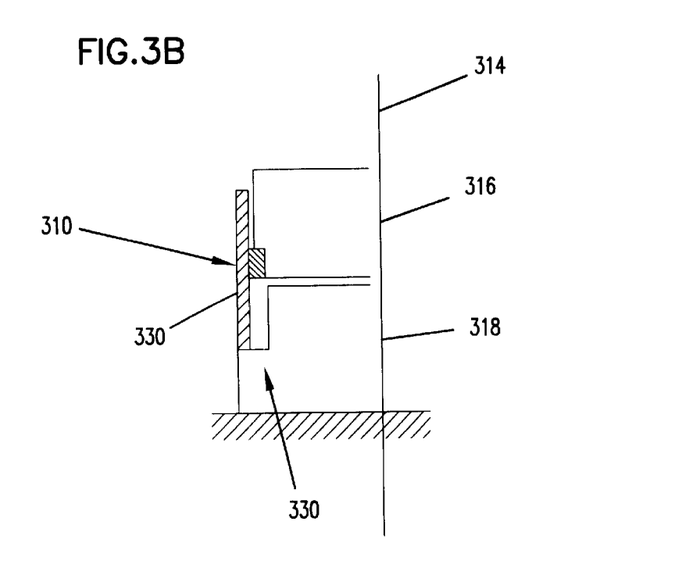
Figure 3C:
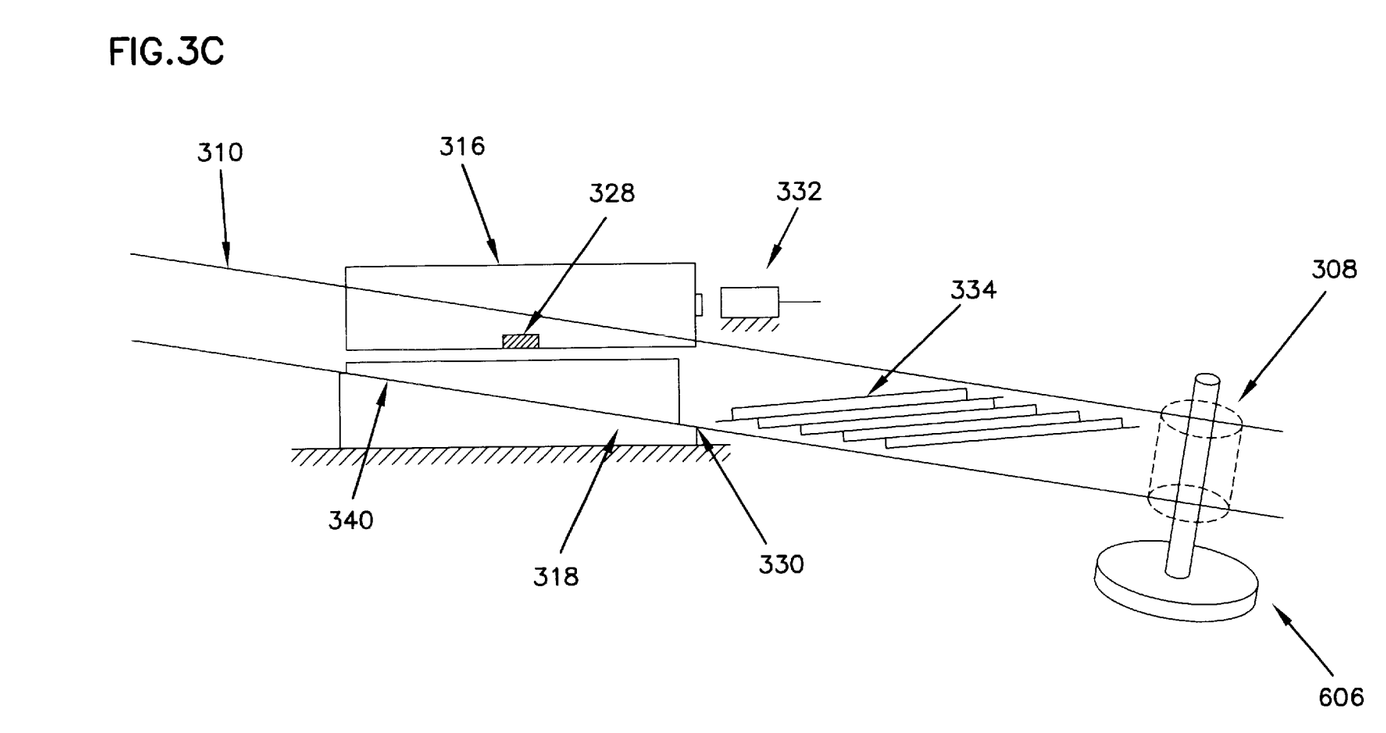

FIGS. 3A–3C illustrate a conventional magnetic tape system 300 for recording digital information on magnetic tape 310. The magnetic tape system 300 has a tape transport mechanism 302 and a rotating cylindrical drum 304, which rotates in a direction of travel indicated by arrow 333.

The tape transport 302 has a capstan 306 and two tape guides 308. A capstan drive motor (not shown) rotates the capstan 306 in order to move the tape 310 in a direction of tape travel indicated by arrows 312. As shown in FIG. 3A, the cylindrical drum 304 rotates counter-clockwise. The read and write heads enter from the bottom edge of the magnetic tape 310 and exit from the top edge of the magnetic tape 310.

The cylindrical drum 304, is rotateable about a drum axis 314. The cylindrical drum 304 is composed of a rotating upper drum 316 and a stationary lower drum 318, as represented in FIG. 3B. The drum axis 314 is orthogonal to the cylindrical surface of both the upper drum 316 and the lower drum 318. The cylindrical drum 304 also has a peripheral surface 320 which wraps around the circumference of the cylindrical drum 304.

Heads are embedded in or mounted on the peripheral surface 320 of the upper drum 316. In the illustrated embodiment of FIG. 3A, the peripheral surface 320 has two sets of heads embedded therein. Specifically, a first set of read heads, 326 and 328, and second set of write heads, 322 and 324 are embedded in the peripheral surface 320. However, the peripheral surface 320 may have any suitable number of heads, including but not limited to, multiple read and write heads, and even one read head and one write head. For simplicity of explanation, FIGS. 3B and 3C-5 only show one read head 328.

The magnetic tape 310 is contiguous with both the upper drum 316 and the lower drum 318 and it is positioned at a slight angle to the peripheral surface 320 of the upper drum 316. More specifically, the magnetic tape 310 is positioned so that helical scan data tracks 334 are generated by the magnetic tape system 300, as shown in FIG. 3C. The data tracks 334 are written diagonally across the tape 310, from one edge of the tape 310 to the other edge of the tape 310. The angle of the tracks are related to the geometry of the magnetic tape system 300, the width of the tape 310, and the rotation speed of the upper drum 316.

The lower drum 318 has a precision cut edge 330 that protrudes from peripheral surface 320 of the lower drum 318. The precision cut edge 330, and other suitable guides, can be used to guide the tape edge 340 and to hold the tape edge 340 in place, as represented by FIGS. 3B and 3C.

The upper drum 316 has an embedded pulse generator (PG) encoder 332, shown in FIG. 3C. The PG encoder 332 detects rotations of the drum motor shaft (not shown), and hence of the upper drum 316, and produces a position-related timing pulse every time the upper drum 315 rotates one revolution. These PG pulses are related to the characteristics of the upper drum (e.g., the rotating speed of the upper drum, the circumference of the upper drum, etc.).

In conventional magnetic tape systems 300, the PG pulse is typically used as a reference point for the read (and write) process. The position of the read head 328 relative to the PG pulse is often known. The time TØ required to travel between the point at which the PG pulse is sensed and the start of the data tracks may also be known. Therefore, once the PG pulse is generated and sensed, the magnetic tape system waits a required amount of time, and then begins the writing process. During the reading process, the capstan motor controls the timing, such that the time required for the read head 328 to travel from the point at which the pulse is sensed to the start of a data region is always TØ.

The TØ value represents the timing of a magnetic tape system 300 when the tape position and alignment are perfectly controlled. Specifically, the magnetic tape 310 is maintained at a constant vertical position relative to the cylindrical drum 304 (i.e., the magnetic tape 310 does not move up and down); the read head 328 is perfectly aligned with the data tracks 334 on the magnetic tape 310 before the reading process begins; and this alignment is maintained during the operation of the magnetic tape system 300.

Many factors can affect the timing of a magnetic tape system 300, such that the relative timing during the operation of the magnetic tape system 300 is unequal to TØ. Some factors are dirt build up on the precision cut edge 330; dirt build up on the capstan 306; and whether two different magnetic tape systems were used to write the data tracks 334. Preferred embodiments of the present invention provide a calibration system that produces a relative timing, during operation of a magnetic tape system 300, that is always equal to TØ. In particular, embodiments of the present invention employ a reference track that is located on the magnetic tape 310.

Because the reference track is located on the magnetic tape 310, the distance between the reference track and the data tracks 334 is not related to variations in the magnetic tape system 300. That is, the distance is not related to the ability of the precision cut edge 330 to guide the magnetic tape 310 nor is the distance related to the to ability of the tape transport 302 to transport the magnetic tape 310. Additionally, the distance is not related to whether the data tracks 334 were written by different magnetic tape systems 300. Instead, the distance is almost solely related to the characteristics of the magnetic tape 310. Prior to discussing the reference track, a calibration technique used in accordance with the present invention will be discussed.

Calibration

Before a read (or write) process begins, the magnetic tape system 300 is calibrated. Calibration involves calculating the time TØ required to travel from a point at which a reference signal is sensed to a point in a data region of the magnetic tape 310. In many traditional magnetic tape systems, the reference signal is the system dependent PG pulse. In the preferred embodiment of the present invention, the reference signal is a recorded tape dependent reference track. Calibration is typically performed in same the manner, irrespective of the definition of the reference signal.

Figure 4:
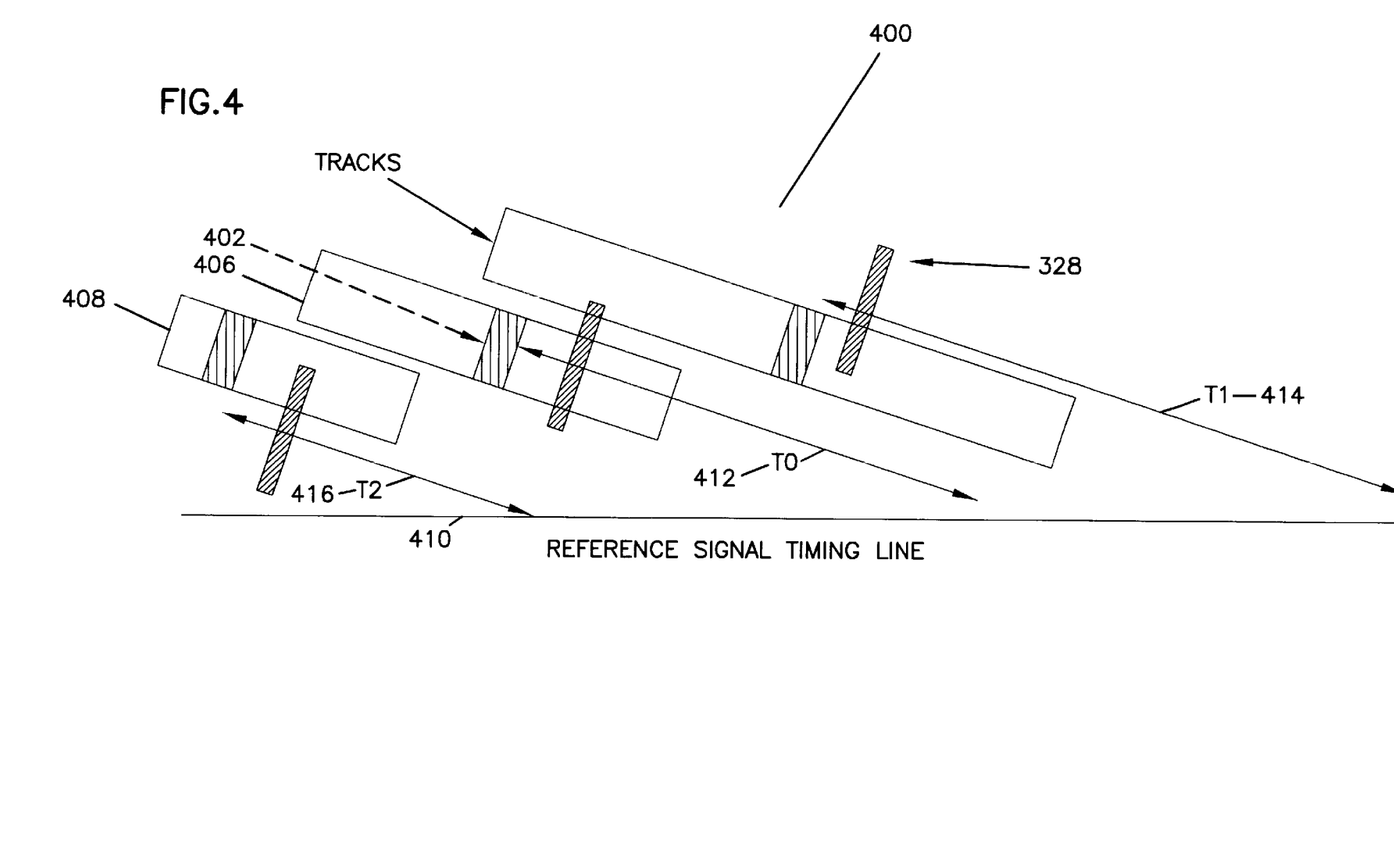
FIG. 4 is a graph representing the time required to travel from a point at which a reference signal is sensed to the point at which a subcode is sensed.

FIG. 4 shows a graph 400 that represents the time required to travel from a point at which a reference signal is sensed to a point in the data region of the magnetic tape 310 (note, the entire width of the magnetic tape is shown in FIG. 3C and FIG. 4 only shows the data tracks, 404, 406, and 408.) The point traveled to in the data region of the magnetic tape 310 is typically the subcode 402. The subcode 402 is a marker contained in each data track, 404, 406, and 408. It contains information about each data track 404, 406, and 408, such as the track number. The American National Standards Institute (ANSI) requires that each subcode 402 be physically positioned at a specific location within a data track. Namely, the subcode 402 must be located at a pre-specified distance (usually measured in data bits) from the starting point of the data bits contained in each data track 404, 406, and 408.

The reference signal timing line 410 represents the time required to travel from the point at which the reference signal is sensed to the point at which the subcode 402 is sensed. A processor within the magnetic tape system 300 is programmed to determine the timing. The TØ value 412 represents the timing of a magnetic tape system 300 when the head 328 is sufficiently aligned with a data track. The head 328 is sufficiently aligned when the width of the head 328 equally straddles both edges of a data track. The head 328 is sufficiently aligned with data track 406 because the width of the head 328 equally straddles both edges of the data track 406.

For both data track 404 and data track 408, the head 328 is not aligned with the data tracks. Specifically, for data track 404, the head 328 only crosses the upper edge of the data track 404. The resulting time required to travel from the point at which the reference signal is sensed to the point at which the subcode 402 is sensed is T1 414. Since T1 414 is greater than TØ 412 a read error will occur during the operation of the magnetic tape system 300.

For data track 408, the head 328 only crosses the lower edge of the data track 408. The resulting time required to travel from the point at which the reference signal is sensed to the point at which the subcode 402 is sensed is T2 416. Since T2 416 is less than TØ 412 a read error will occur during the operation of the magnetic tape system 300.

Figure 5:
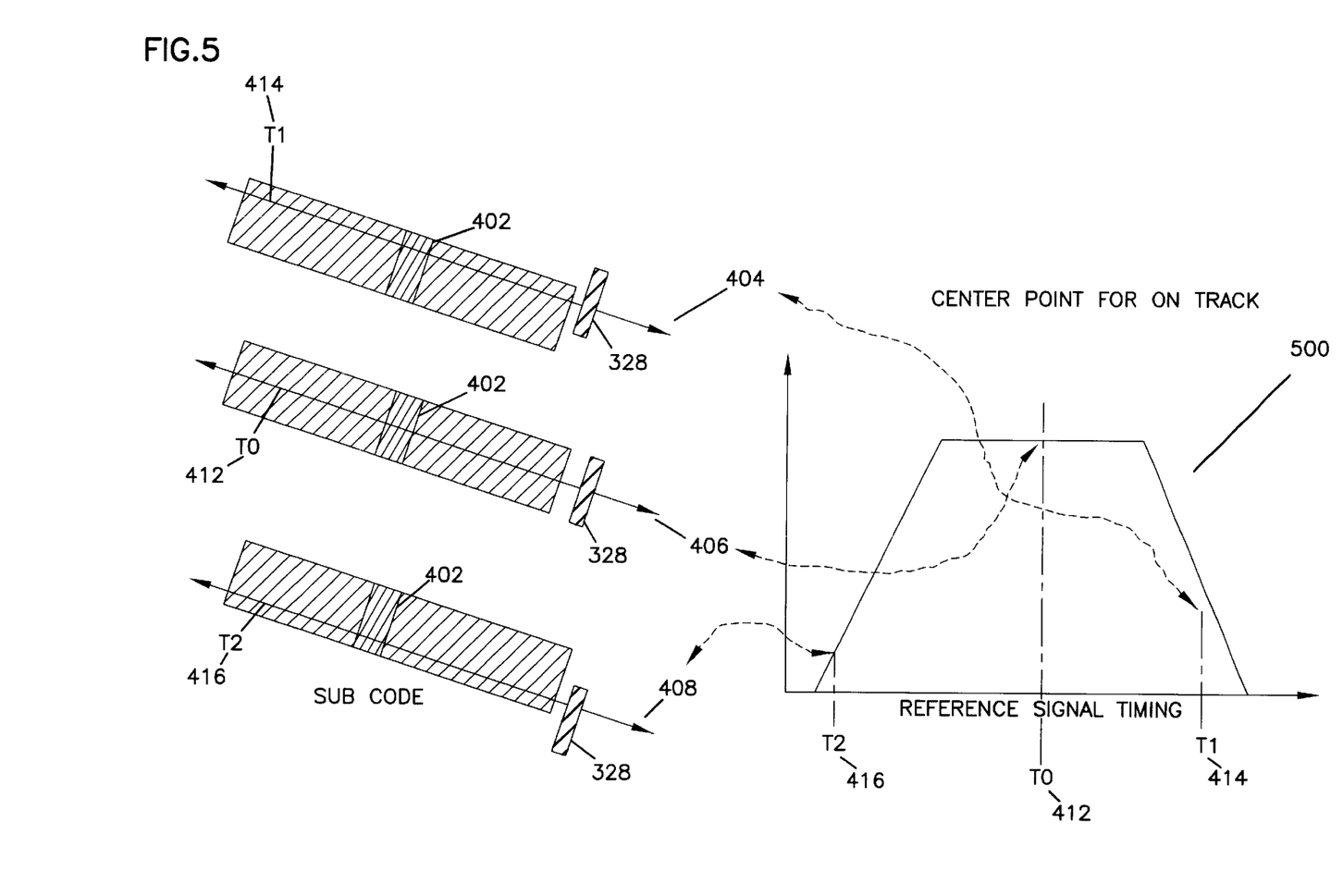
FIG. 5 is a graph representing the relationship between the magnitude of a data signal and the time required to travel from a point at which a reference signal is sensed to the point at which a subcode is sensed.

FIG. 5 shows a graph 500 that represents the relationship between the magnitude of a data signal and the time required to travel from a point at which a reference signal is sensed to the point at which a subcode 402 is sensed. The horizontal axis of graph 500 is the reference signal timing line 502. The vertical axis 504 is the magnitude of the signal (also referred to as the RF envelope) measured in counts.

The relative timing of data tracks 404, 406, and 408 is shown on graph 500. As observed, the head 328 senses the greatest signal magnitude for data track 406 at time TØ 412. The magnitudes for data tracks 404 and 408 are considerably lower, at time T1 414 and time T2 416, respectively.

Figure 6A:
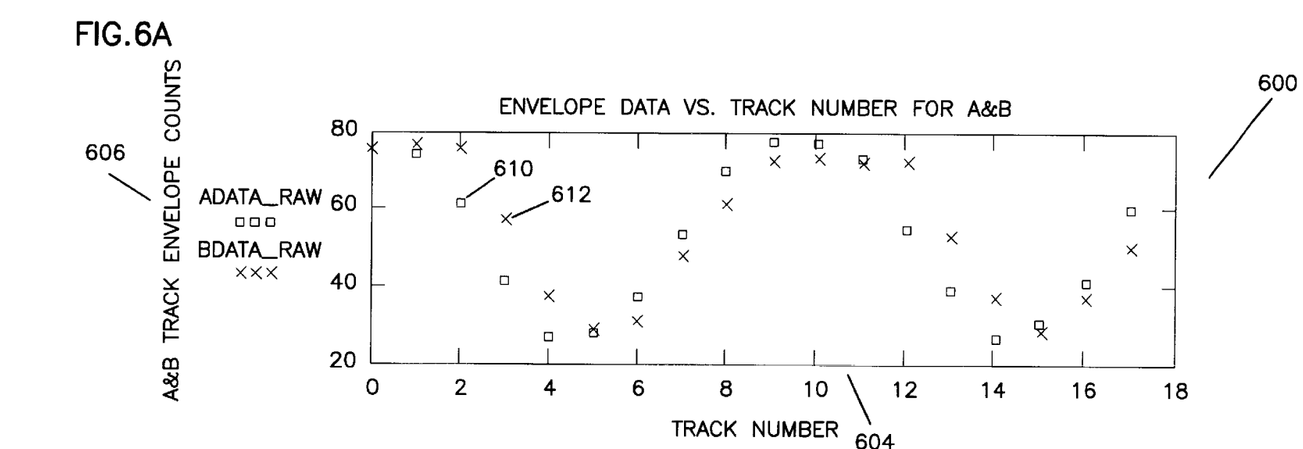
FIGS. 6A–6B are graphs that illustrate how the performance characteristics of a magnetic tape system vary with track number.
Figure 6B:
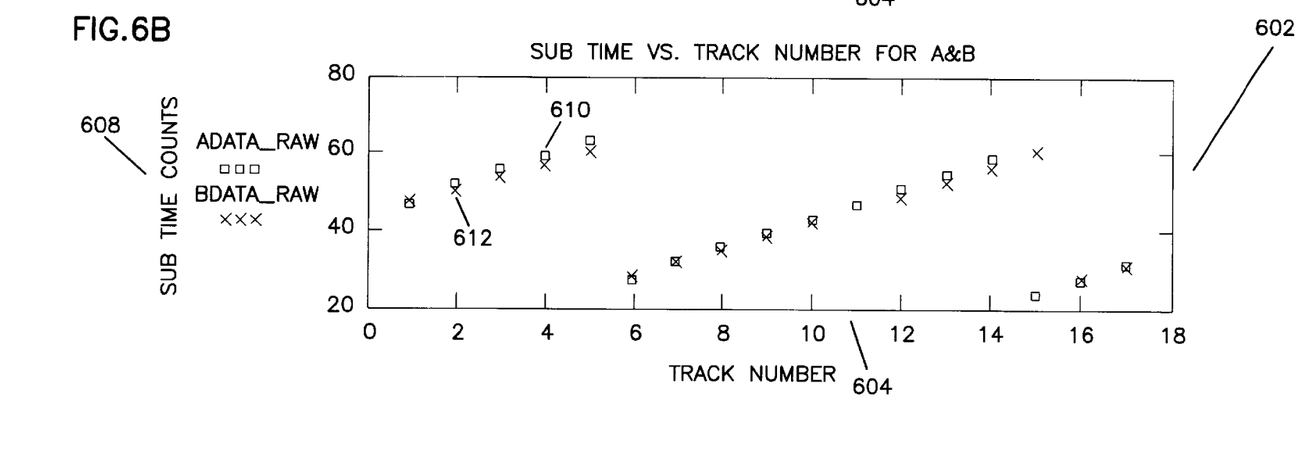

FIGS. 6A and 6B are graphs that illustrate how the performance characteristics of a magnetic tape system 300 vary with track number. FIG. 6A represents signal magnitude versus track number in counts and FIG. 6B represents relative timing versus track number in counts. This data is usually generated by moving the magnetic tape at speeds very close to the actual writing speed, without controlling the time TØ. Therefore, these curves represent the relationship between the asynchronous behavior of the read data signal amplitude and the time required to travel from the point at which the reference signal is sensed to the point at which the subcode is sensed. These curves are used for calibrating TØ.

In FIG. 6A, the graph 600 displays the performance of two different heads, head A 610 and head B 612. Data from head A 610 is represented by a square and data from head B 612 is represented by an "x." The vertical axis 606 is the signal magnitude measured in counts. The horizontal axis 604 is the track number. The data follows a sine wave, with both head A 610 and head B 612 sensing the greatest signal magnitude at track number 0 and track number 10.

In FIG. 6B, the graph 602 also displays the performance of head A 610 and head B 612. The vertical axis 608 is relative timing measured in counts. A count is related to the internal clock of the magnetic tape system 300. For example, if the magnetic tape system 300 has an internal clock that is incremented every 100 nanoseconds, than each individual count represents 100 nanoseconds. The horizontal axis 604 is the track number. Both head A 610 and head B 612 achieve the smallest timing at track number 6 and again at track number 15.

Figure 7:
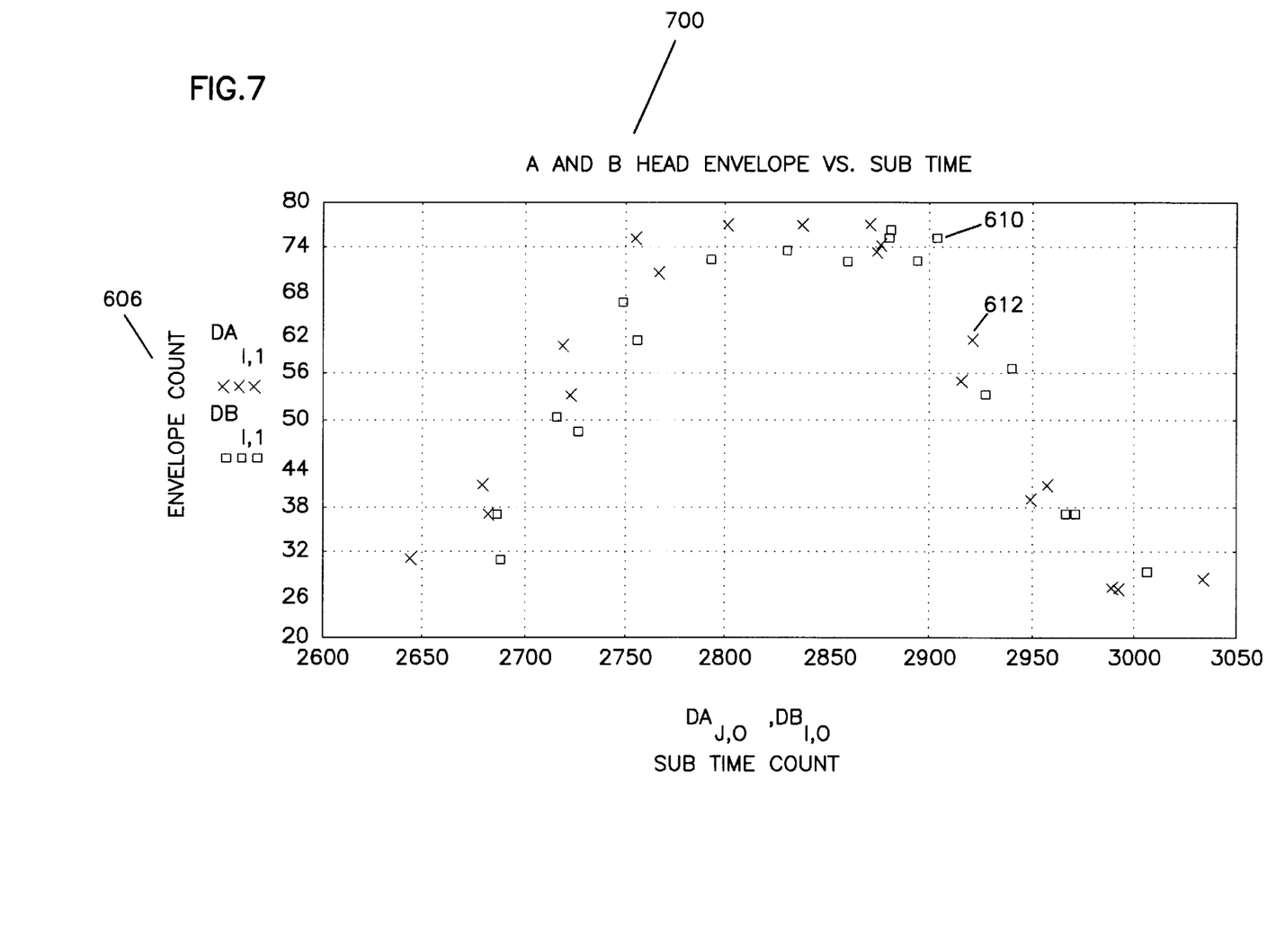
FIG. 7 is a graph that represents the relationship between the data signal magnitude and the sub-time count.

FIG. 7 is a graph 700 that represents the relationship between the data signal magnitude and the relative timing. The graph 700 is a combination of graph 600 and graph 602. In particular, the vertical axis 606 represents the signal magnitude and the horizontal axis 608 represents the timing. The performance of both head A 610 and head B 612 is shown. For head A 610, the greatest signal magnitude is approximately 74 counts at time 2825 counts. For head B 612, the greatest signal magnitude is approximately 80 counts at 2825 counts.

Figure 8A:
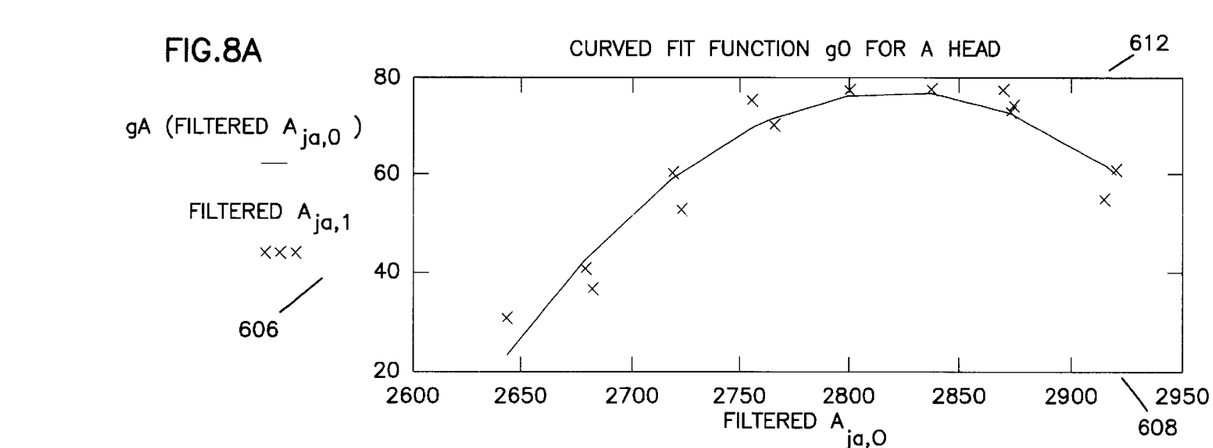
FIGS. 8A–8B represent a curve fit of the data signal magnitude for two different heads.
Figure 8B:
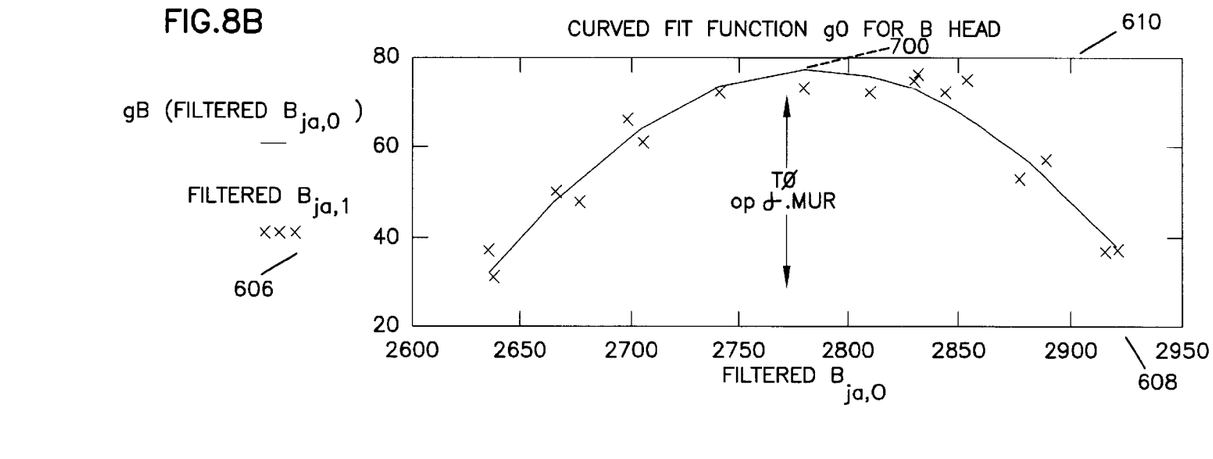

FIGS. 8A–8B represent a curve fit of the data signal magnitude for head A 612 and head B 610. During calibration, a computer simulation of the magnetic tape system 300 uses a curve fit to determine the greatest signal magnitude. In particular, the computer simulation calculates the derivative at each point on the curve and then identifies the time at which the derivative is equal to zero. The time at which the derivative is zero corresponds to the maximum point on the curve, and thus, to the greatest signal magnitude. For head A 610, the greatest signal magnitude is approximately 74 counts at time 2825 counts. For head B 612, the greatest signal magnitude is approximately 80 counts at 2825 counts.

Reference Track

Figure 9:
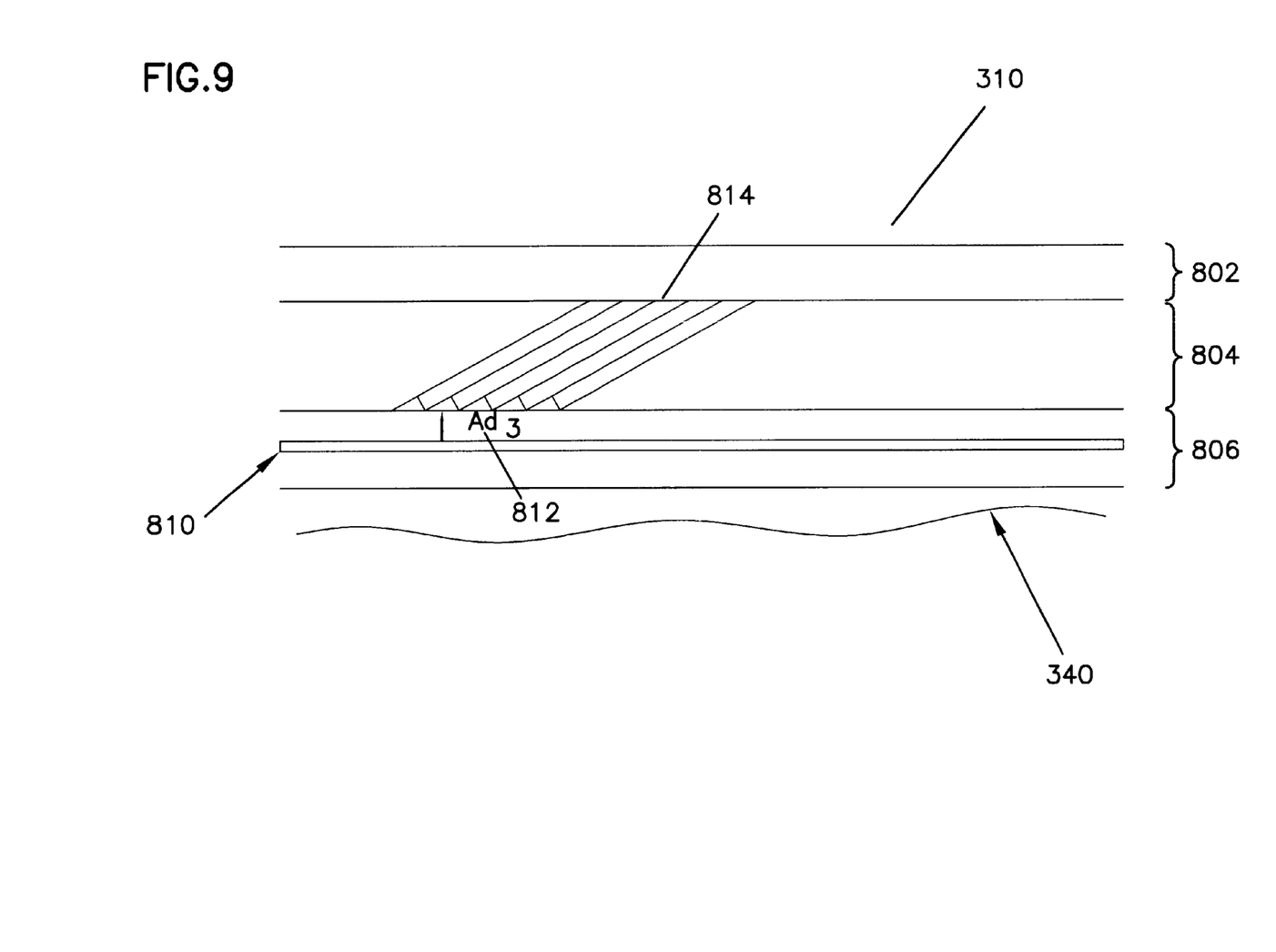
FIG. 9 represents and embedded reference track in accordance with the present invention.

In preferred embodiments of the present invention, the reference track is recorded on the magnetic tape 310. As shown in FIG. 9, an exemplary magnetic tape 310 has an upper no data region 802, a data region 804, and a lower no data region 806. The recorded reference track 810 can be located within either no data region, 802 or 806. Locating the recorded reference track 810 in this manner prevents density related problems because the recorded reference track 810 does not occupy the data region 804.

The magnetic tape system 300 is calibrated using the recorded reference track 810 (also referred to as an embedded stripe). TØ is fixed, and thus, the distance $\Delta d_3$ 812 is fixed. During the read process, the read head 328 senses the recorded reference track and the magnetic tape system 300 controls the speed of the capstan motor, such that the time required for the read head 328 to travel from the point at which the reference track is sensed to the subcode is always TØ.

TØ is related to the characteristics of the magnetic tape 310, and not the characteristics of a particular magnetic tape system 300. Therefore, during the writing process, incorrect appends are not generated. Moreover, the read head 328 is always sufficiently aligned with the data tracks 814 and no re-calibration is required.

In the preferred embodiments of the present invention, calibration is typically only required once per magnetic tape system 300. However, a subsequent calibration may be required if the magnetic tape 310 is affected by environmental factors or excessive wearing. Such affects may cause the magnetic tape 310 to shrink or stretch, thus modifying TØ and $\Delta d_3$ 812. But even in this worst case scenario, calibration is performed before the read and write process begins, and not during the operation of the magnetic tape system 300.

As described above, the reference track is recorded on the magnetic tape 300. However, in other embodiments the reference track could be composed of other forms of detectable markings.

Conclusion

This concludes the description of the preferred embodiment of the invention. The present specification discloses apparatuses, systems, and methods for self calibrating a magnetic tape system. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A magnetic tape system comprises:

at least one head mounted within a rotating head drum, a magnetic tape that is contiguous with the head, and a device for providing a relative motion between the magnetic tape and the head drum; and means, for calibrating the magnetic tape system.

* * * * *